United States Patent
Inoue et al.

(10) Patent No.: US 10,836,244 B2
(45) Date of Patent: Nov. 17, 2020

(54) ACTIVE DAMPER

(71) Applicant: HONDA MOTOR CO., LTD., Tokyo (JP)

(72) Inventors: Toshio Inoue, Wako (JP); Hiroyuki Yoshida, Tokyo (JP); Yuho Ito, Wako (JP); Osamu Terashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/140,983

(22) Filed: Sep. 25, 2018

(65) Prior Publication Data

US 2019/0092155 A1 Mar. 28, 2019

(30) Foreign Application Priority Data

Sep. 27, 2017 (JP) .................................. 2017-186923

(51) Int. Cl.
*F16F 5/00* (2006.01)
*B60K 5/12* (2006.01)
(Continued)

(52) U.S. Cl.
CPC .......... *B60K 5/1208* (2013.01); *B60K 5/1283* (2013.01); *F16F 13/102* (2013.01);
(Continued)

(58) Field of Classification Search
CPC ...... B60K 5/1283; F16F 13/10; F16F 13/102; F16F 13/105; F16F 13/106; F16F 13/107;
(Continued)

(56) References Cited

U.S. PATENT DOCUMENTS 4,645,189 A * 2/1987 Quast ...................... F16F 13/22
188/379
2002/0109280 A1* 8/2002 Baudendistel ........ F16F 13/106
267/140.15

(Continued)

FOREIGN PATENT DOCUMENTS

CN 104249618 * 12/2014
CN 104455176 B * 3/2015
(Continued)

OTHER PUBLICATIONS

Machine translation of CN 104455176 (no date).*
(Continued)

*Primary Examiner* — Nicholas J Lane
(74) *Attorney, Agent, or Firm* — Rankin, Hill & Clark LLP

(57) ABSTRACT

An active damper is disclosed which includes: an elastic support body; a first wall section provided at the elastic support body and defines a first liquid chamber; a second wall section provided on an opposite side and defines a second liquid chamber; a partition wall section which separates the first liquid chamber from the second liquid chamber; an orifice in the partition wall section for communication between the first and second liquid chambers; and a damping unit to attenuate the vibrations transmitted from a vibrating source to the vibration-receiving part. The damping unit includes: a coil to generate a magnetic field according to a current supplied; magnetic members forming a closed magnetic circuit for the magnetic field; and a magneto-viscoelastic elastomer having a viscoelasticity changes depending on the magnetic field. At least one of the first and second wall sections, and the partition wall section has the damping unit.

9 Claims, 7 Drawing Sheets

(51) Int. Cl.
    *F16F 13/10*     (2006.01)
    *F16F 13/26*     (2006.01)
    *F16F 13/30*     (2006.01)

(52) U.S. Cl.
    CPC .......... *F16F 13/266* (2013.01); *F16F 13/305* (2013.01); *F16F 2224/0283* (2013.01); *F16F 2228/066* (2013.01)

(58) Field of Classification Search
    CPC ........ F16F 13/26; F16F 13/264; F16F 13/266; F16F 13/268; F16F 13/305
    See application file for complete search history.

(56) References Cited

U.S. PATENT DOCUMENTS

2002/0171186 A1* 11/2002 Baudendistel ........ F16F 13/305
    267/140.15
2010/0187733 A1* 7/2010 Oohashi ................ F16F 13/102
    267/140.13
2017/0219039 A1 8/2017 Inoue

FOREIGN PATENT DOCUMENTS

| | | | |
|---|---|---|---|
| CN | 107023608 A | | 8/2017 |
| JP | 2005-239084 A | | 9/2005 |
| JP | 2015045369 | * | 3/2015 |

OTHER PUBLICATIONS

Machine translation of JP 2015045369 (no date).*
Machine translation of CN 104249618 (no date).*
Chinese Office Action received in corresponding CN application No. 201811109426.5, dated Feb. 3, 2020 with English translation (15 pages).

* cited by examiner

ACTIVE DAMPER

CROSS REFERENCE TO RELATED APPLICATION

This application claims the priority of Japanese Patent Application No. 2017-186923, filed on Sep. 27, 2017 in the Japan Patent Office, the entire specification, claims and drawings of which are incorporated herewith by reference.

TECHNICAL FIELD

The present invention relates to an active damper that can actively attenuate vibrations caused by, for example, an on-vehicle engine.

BACKGROUND ART

Japanese Patent Application Publication No. 2005-239084 (JP2005-239084A) disclosed a fluid-filled active engine mount that can actively attenuate vibrations caused by an on-vehicle engine.

In the active engine mount disclosed in JP2005-239084A, an active vibration-proof effect is exhibited based on excitation displacement of the excitation member by energization to a solenoid type actuator at inputting of idling vibration; and at inputting of engine shake, an elastic stopper projection part projected from the excitation member is abutted on an abutment member at a position left outwardly from the excitation member and a displacement amount of the excitation member is shock-absorbingly restricted.

According to the active engine mount of JP2005-239084A, it is possible to provide an engine mount with an improved structure.

SUMMARY OF INVENTION

An aspect of the present invention provides an active damper interposed between a vibrating source and a vibration-receiving part that receives vibrations of the vibrating source, comprising:
an elastic support body connected to the vibrating source;
a first wall section which is provided at the elastic support body and defines a first liquid chamber;
a second wall section which is provided on an opposite side of the first wall section side and defines a second liquid chamber;
a partition wall section which separates the first liquid chamber from the second liquid chamber;
an orifice which is disposed at the partition wall section and through which liquid passes between the first liquid chamber and the second liquid chamber; and
a damping unit configured to attenuate the vibrations transmitted from the vibrating source to the vibration-receiving part,
the damping unit comprising:
an excitation coil configured to generate a magnetic field, a strength of which depends on an amplitude of a current supplied;
magnetic members configured to form a circular closed magnetic circuit, a path for the magnetic field generated by the excitation coil; and
a magneto-viscoelastic elastomer, a viscoelasticity of which changes depending on the strength of the magnetic field generated by the excitation coil and which is provided in the closed magnetic circuit formed of the magnetic members, wherein
at least one of the first wall section, the second wall section, and the partition wall section has the damping unit.

According to the aspect of the present invention, when a current is supplied to the excitation coil, the viscoelasticity of the magneto-viscoelastic elastomer may change depending on the strength of the magnetic field generated in the closed magnetic circuit. Then, the rigidity of the damping unit changes and the vibration-damping level at the damping unit also changes accordingly. If the amplitude and timing of the current supplied to the excitation coil are appropriately adjusted depending on the magnitude and frequency of the input vibrations, a damping effect on vibration components can be elicited regardless of the (high or low) frequency of the vibrations.

According to the aspect of the present invention, at least one of the first wall section, the second wall section, and the partition wall section may have the damping unit. This may makes it possible to retain a damping effect on vibration components over a broad frequency band.

DESCRIPTION OF EMBODIMENTS

Figure 1A:
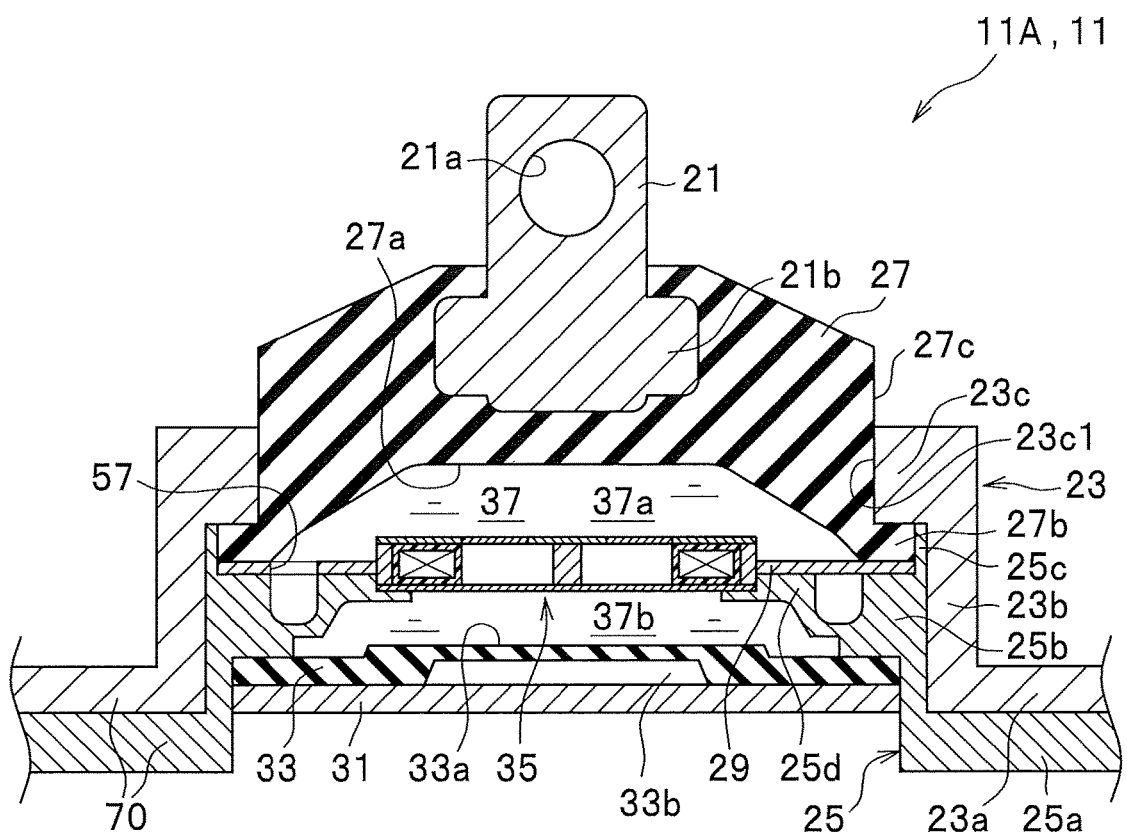
FIG. 1A is a longitudinal sectional view schematically illustrating an active damper according to a first embodiment of the present invention.

Prior to describing an embodiment of the present invention, the above-mentioned related art will be further argued.

The active engine mount of JP2005-239084A exerts an active vibration-proof effect based on excitation displacement of the excitation member by using a solenoid type actuator. Because of this, the frequency characteristics of vibration waves given to the excitation member so as to exert the vibration-proof effect are restricted by, for instance, the resonance characteristic of the excitation member. As a result, a damping effect on vibration components over a broad frequency band may not be sufficiently elicited.

The present invention has been developed to solve the above problem. The purpose of the present invention is to provide an active damper that can retain a damping effect on vibration components over a broad frequency band.

Hereinafter, active dampers 11 according to embodiments of the present invention are described in detail, referring to the Drawings. Note that an active damper 11A according to the first embodiment to an active damper 11E according to the fifth embodiment are generally referred to as "each active damper 11".

[Outline of Active Damper 11A According to First Embodiment of the Present Invention]

Figure 1B:
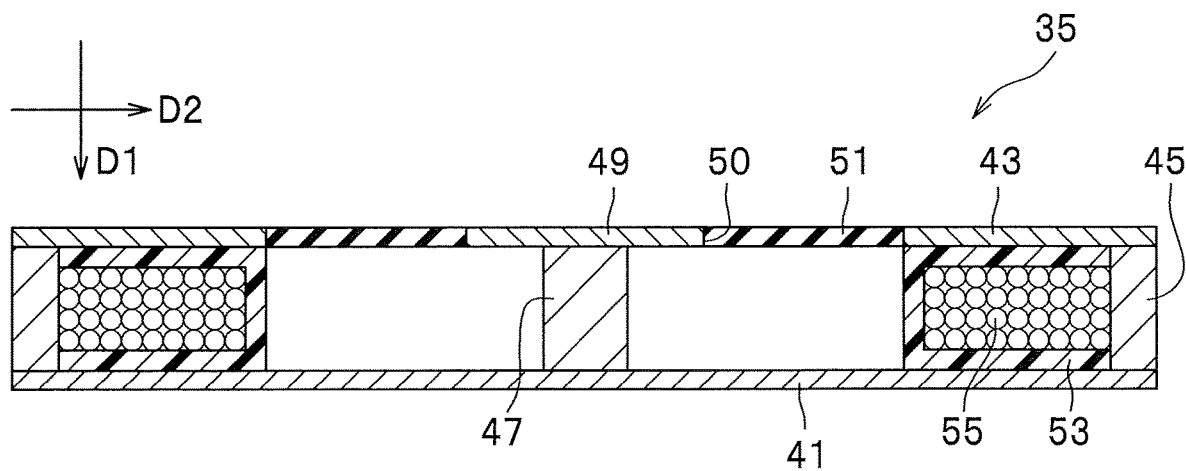
FIG. 1B is a longitudinal sectional magnified view schematically illustrating a damping unit, which is a main unit of the active damper according to the first embodiment.
Figure 2A:
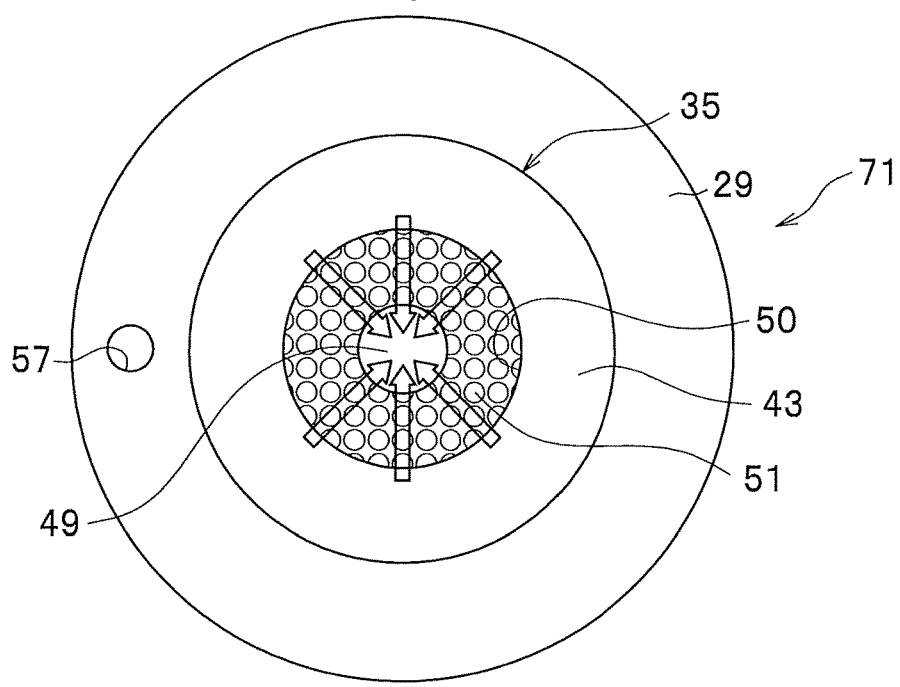
FIG. 2A is a top view of the damping unit included in the active damper according to the first embodiment.
Figure 2B:
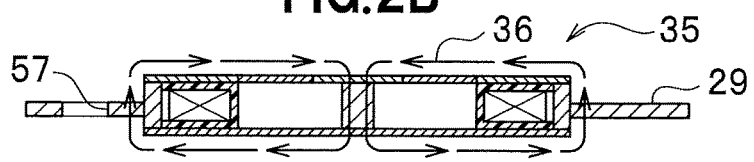
FIG. 2B is a longitudinal sectional view of the damping unit included in the active damper according to the first embodiment.
Figure 2C:
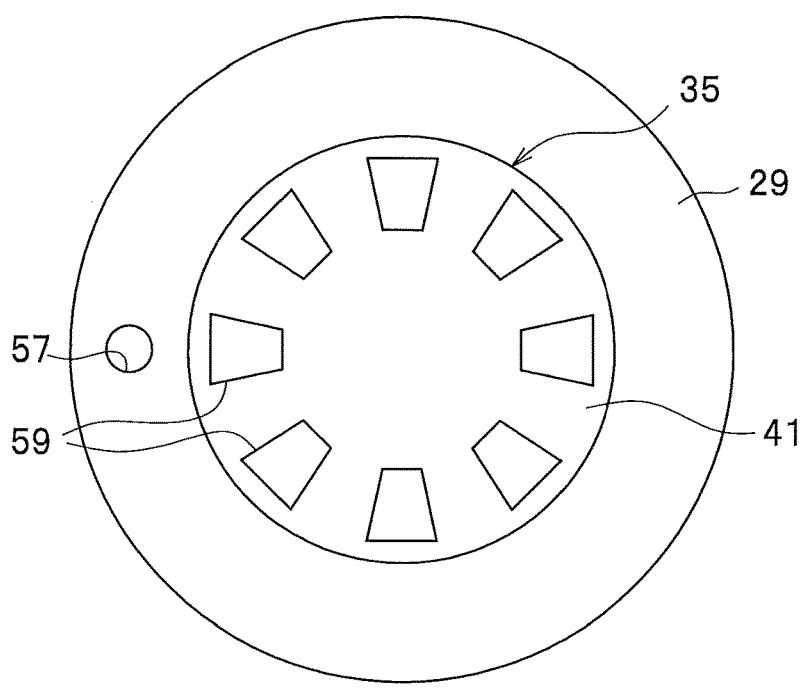
FIG. 2C is a bottom view of the damping unit included in the active damper according to the first embodiment.

First, with reference to FIGS. 1A, 1B, and 2A to 2C, described is an outline of an active damper 11A according to the first embodiment of the present invention. FIG. 1A is a longitudinal sectional view schematically illustrating the active damper 11A according to the first embodiment of the present invention. FIG. 1B is a longitudinal sectional magnified view schematically illustrating a damping unit 35, which is a main unit of the active damper 11A according to the first embodiment. FIG. 2A is a top view of the damping unit 35 included in the active damper 11A according to the first embodiment. FIG. 2B is a longitudinal sectional view of the damping unit 35 included in the active damper 11A according to the first embodiment. FIG. 2C is a bottom view of the damping unit 35 included in the active damper 11A according to the first embodiment.

Figure 7:
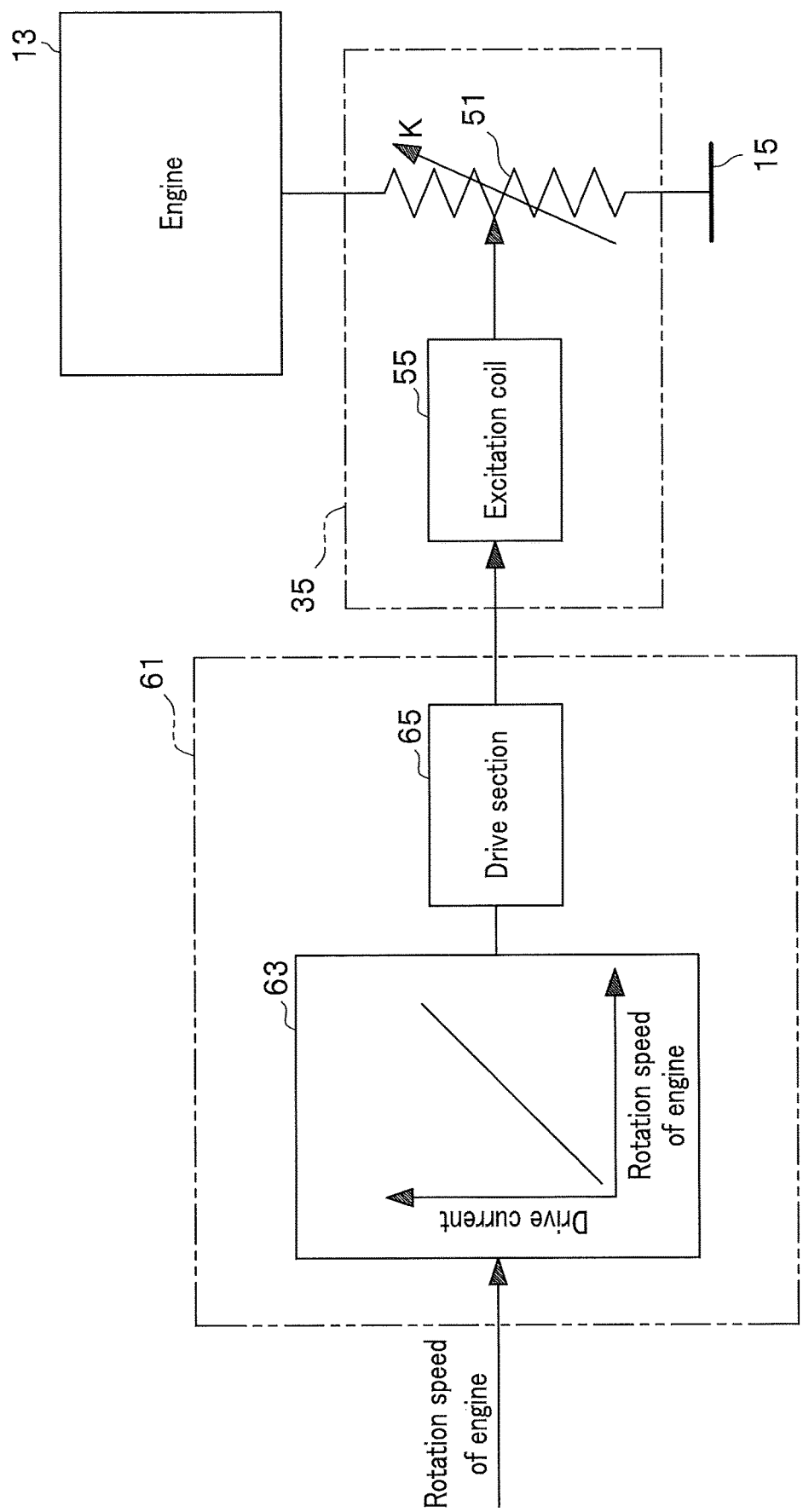
FIG. 7 is a block diagram showing, in short, a controller, configured to execute drive control of a damping unit included in each active damper according to the present invention, and its peripherals.

The active damper 11A according to the first embodiment of the present invention has a damping function of actively attenuating vibrations transmitted from an engine 13 (vibrating source) installed on a vehicle (not shown) to a vehicle body frame 15 (vibration-receiving part; see FIG. 7).

The following three main functions are necessary for engine mounts. Specifically, the first function is to support the engine 13, which is a heavy object; the second function is to attenuate vibrations caused during operation of the engine 13 so as not to transmit the vibrations to the vehicle body frame 15; and the third function is to suppress resonance of the engine 13 when vibrations are input from a road surface.

To realize, in particular, the second damping function among the three functions, the active damper 11A according to the first embodiment includes: a substantially cylindrical metal-made first mounting part 21 attached (connected) to the engine 13; and a metal-made second mounting part 23 and a third mounting part 25 attached (connected) to the vehicle body frame 15, as shown in FIG. 1A.

The first mounting part 21 has a mounting hole 21a used when a mounting member (not shown) on the engine 13 side is mounted thereto. A swelling portion 21b is integrated on the opposite side of the mounting hole 21a of the first mounting part 21.

The swelling portion 21b of the first mounting part 21 is covered by an elastic support body 27 made of elastic material such as rubber. The elastic support body 27 is shaped like an inverted thick sake cup. The rigidity and damping characteristics of the elastic support body 27 are set to appropriate values.

A first wall section 27a, which is a bottom wall portion of the elastic support body 27, is shaped like an inverted mortar having an opening that gets wider in the downward direction. As shown in FIG. 1A, a liquid chamber 37 is formed below the elastic support body 27.

A space of the liquid chamber 37 is defined by the first wall section 27a, which is a bottom wall portion of the elastic support body 27, a second wall section 33a (described below), which is a top wall portion of a diaphragm 33, and a peripheral wall portion 25b (described below) of the third mounting part 25.

The liquid chamber 37 is filled with incompressible fluid such as water, alkylene glycol, polyalkylene glycol, and silicone oil. A seal portion 27b, which extends, like a flange, outwardly in the radial direction, is integrated with a bottom edge portion on the outer circumferential side of the elastic support body 27. This seal portion 27b is sandwiched in the circumferential direction between the second mounting part 23 and the third mounting part 25.

Specifically, as shown in FIG. 1A, the second mounting part 23 includes: an annular flat portion 23a; a substantially cylindrical peripheral wall portion 23b that stands vertically on the inner side end of the flat portion 23a; and a circumferential stopper portion 23c that extends inwardly relative to the upper side end of the peripheral wall portion 23b.

The lower end surface of the stopper portion 23c of the second mounting part 23 is in contact with the upper end surface of the seal portion 27b in the circumferential direction. In addition, the inner surface 23c1 of the stopper portion 23c of the second mounting part 23 is in contact with the outer surface 27c of the elastic support body 27 in the circumferential direction. This configuration provides liquid tightness between the second mounting part 23 and the elastic support body 27.

Meanwhile, the third mounting part 25 includes: an annular flat portion 25a; a substantially cylindrical peripheral wall portion 25b that stands vertically on the inner side end of the flat portion 25a; a circumference protrusion portion 25c that protrudes upwardly relative to the outer side upper end of the peripheral wall portion 25b; and a circumferential supporting potion 25d that extends inwardly relative to the inner side end of the peripheral wall portion 25b.

The inner surface of the protrusion portion 25c of the third mounting part 25 is in contact with the outer surface of the seal portion 27b in the circumferential direction. In addition, an upper end surface of the peripheral wall portion 25b is in contact with the lower end surface of the seal portion 27b in the circumferential direction while an outer edge portion of the below-described annular mounting part 29 is sandwiched therebetween. This configuration provides liquid tightness between the third mounting part 25 and the elastic support body 27.

On the inner surface of the peripheral wall portion 25b of the third mounting part 25 is attached a disk-like metal lid member 31 by using a bonding means such as welding. A diaphragm 33 made of elastic material such as rubber is provided on the upper surface side of the lid member 31.

The diaphragm 33, which is an elastic rubber membrane, has a substantially disk-like shape. On the center bottom side of the diaphragm 33 is formed a circular truncated cone recess portion 33b (i.e., trapezoidal when its longitudinal cross section is viewed). The outer peripheral portion of the diaphragm 33 is in contact with the lower end surface of the peripheral wall portion 25b of the third mounting part 25, the inner surface of the peripheral wall portion 25b, and the upper surface of the peripheral edge of the lid member 31. This configuration allows for liquid tightness between the third mounting part 25 and the diaphragm 33. The diaphragm 33 plays a role of receiving movement of the incompressible fluid enclosed in the liquid chamber 37 while utilizing damping characteristics specific to the diaphragm 33.

The damping unit 35 is attached to the supporting portion 25d of the third mounting part 25. The damping unit 35 has a damping function of actively attenuating vibrations transmitted from the on-vehicle engine 13 to the vehicle body frame 15 (see FIG. 8).

In the active damper 11A according to the first embodiment, the damping unit 35 serves as a "partition wall section (membrane)" used to compartmentalize the liquid chamber 37 into a first liquid chamber 37a and a second liquid chamber 37b. That is, in the active damper 11A according to the first embodiment, the "partition wall section (membrane)" is provided with the damping unit 35. The first liquid chamber 37a is defined by the first wall section 27a, which is a bottom wall portion of the elastic support body 27, and the damping unit 35. The second liquid chamber 37b is defined by the damping unit 35 and the second wall section 33a, which is a top wall portion of the diaphragm 33. In other words, the second wall section 33a constitutes a bottom wall portion of the second liquid chamber 37b.

To achieve the above damping function, the damping unit 35, as shown in FIGS. 1B and 2A to 2C, includes: an annular mounting part 29; a unit of magnetic members including a first magnetic member 41, a second magnetic member 4; a third magnetic member 45, a fourth magnetic member 47, and a fifth magnetic member 49; a magneto-viscoelastic elastomer 51; a bobbin 53; and an excitation coil 55.

The annular mounting part 29 is formed of an annular metal plate member as shown in FIGS. 2A and 2B. The inner size of the annular mounting part 29 is equal to the outer size of the below-described third magnetic member 45. The annular mounting part 29 is bonded to the outer side wall of the third magnetic member 45 by using a bonding means such as welding. The outer edge portion of the annular mounting part 29 is sandwiched between the seal portion 27b of the elastic support body 27 and the upper end surface of the peripheral wall portion 25b of the third mounting part 25.

As shown in FIGS. 1A and 2A to 2C, the annular mounting part 29 has an orifice 57 through which liquid passes between the first liquid chamber 37a and the second liquid chamber 37b.

The hole size and the path length of the orifice 57 are set to appropriate values such that the vibration-proof effect, which is based on resonance of the incompressible fluid fluidized in the liquid chamber 37 in response to a difference in pressure generated between the first liquid chamber 37a and the second liquid chamber 37b, can be effectively exerted over a frequency band for low-frequency large-amplitude vibrations such as an engine shake.

As shown in FIGS. 1B and 2C, the first magnetic member 41 has a substantially disk-like shape. As a magnetic material applicable to the first magnetic member 41, used is a ferromagnetic or a ferrimagnetic iron-based metal (e.g., a ferrite). The first magnetic member 41 is not magnetized when there is no magnetic field. However, when a magnetic field occurs, the first magnetic member 41 is magnetized in the direction of the magnetic field.

Note that the below-described second to fifth magnetic members 43, 45, 47, and 49 are the same as the first magnetic member 41 with respect to the points where a ferromagnetic or ferrimagnetic is used as each magnetic member and when a magnetic field occurs, each member is magnetized in the direction of the magnetic field.

As shown in FIGS. 1B and 2A, the second magnetic member 43 is formed of an annular plate member. The outer size of the second magnetic member 43 is equal to the outer size of the first magnetic member 41. The second magnetic member 43 is disposed facing the first magnetic member 41. As shown in FIGS. 1B and 2A, the second magnetic member 43 has a circular opening portion 50. The below-described magneto-viscoelastic elastomer 51 is deployed so as to fill in this opening portion 50.

As shown in FIG. 1B, the third magnetic member 45 has a cylindrical shape. The outer size of the third magnetic member 45 is equal to the outer size of each of the first magnetic member 41 and the second magnetic member 43. The third magnetic member 45 is interposed between the first magnetic member 41 and the second magnetic member 43.

As shown in FIG. 1B, the fourth magnetic member 47 has a cylindrical shape. The fourth magnetic member 47 is disposed on a center upper surface of the first magnetic member 41. The height of the fourth magnetic member 47 is equal to the height of the third magnetic member 45.

As shown in FIG. 1B, the fifth magnetic member 49 has a disk-like shape. The fifth magnetic member 49 is disposed on the upper surface of the fourth magnetic member 47. The outer size of the fifth magnetic member 49 is larger than the outer size of the fourth magnetic member 47.

As shown in FIGS. 1B and 2A, the magneto-viscoelastic elastomer 51 is formed of an annular plate member. The magneto-viscoelastic elastomer 51 is deployed so as to occupy the annular opening portion 50 formed between the second magnetic member 43 and the fifth magnetic member 49.

The magneto-viscoelastic elastomer 51 includes: a substrate elastomer (not shown) having viscoelasticity as a matrix; and magnetic particles (not shown) dispersed in the substrate elastomer.

Known polymer materials having viscoelasticity at room temperature may be suitably used as the substrate elastomer, examples of which include ethylene-propylene rubber, butadiene rubber, isoprene rubber, and silicone rubber.

The magnetic particles are characterized by magnetic polarization induced by a magnetic field. Particles made of known materials may be suitably used as the magnetic particles, examples of which include: metals such as pure iron, electromagnetic soft iron, oriented silicon steel, Mn—Zn ferrite, Ni—Zn ferrite, magnetite, cobalt, and nickel; organic matters such as 4-methoxybenzylidene-4-acetoxyaniline and a triaminobenzene polymer; and organic-inorganic composites such as a ferrite-dispersed anisotropic plastic.

As shown in FIG. 1B, the bobbin 53 has a typical reel shape. The bobbin 53 is formed of material such as an electrically insulated synthetic resin.

As sown in FIG. 1B, each excitation coil 55 is formed such that a wire coated with an insulator film is wound around the bobbin 53.

The following describes an effect of the active damper 11A according to the first embodiment.

When a current flows through the excitation coil 55 disposed in the damping unit 35, the excitation coil 55 generate a magnetic field, the strength of which depends on the amplitude of the current supplied. Then, a closed magnetic circuit 36 in the direction indicated by FIGS. 2A and 2B is formed. At this time, the viscoelasticity of the magneto-viscoelastic elastomer 51 changes depending on the strength of the magnetic field acting on the closed magnetic circuit. Subsequently, the rigidity of the damping unit 35 (membrane) changes. In addition, when the engine 13 (vibrating source)-derived vibrations are input and the rigidity of the damping unit 35 (membrane) changes, the flow volume of the incompressible fluid passing through the orifice 57 also changes. As a result, the damping characteristic of the active damper 11A change. Note that the damping characteristics of the active damper 11A include the resonance characteristic of the damping unit 35 as a membrane.

The active damper 11A according to the first embodiment is configured to provide the partition wall section (membrane) with the damping unit 35 that provides a flat frequency characteristic. This makes it possible to retain a damping effect on vibration components over a broad frequency band.

[Outline of Active Damper 11B According to Second Embodiment of the Present Invention]

Figure 3:
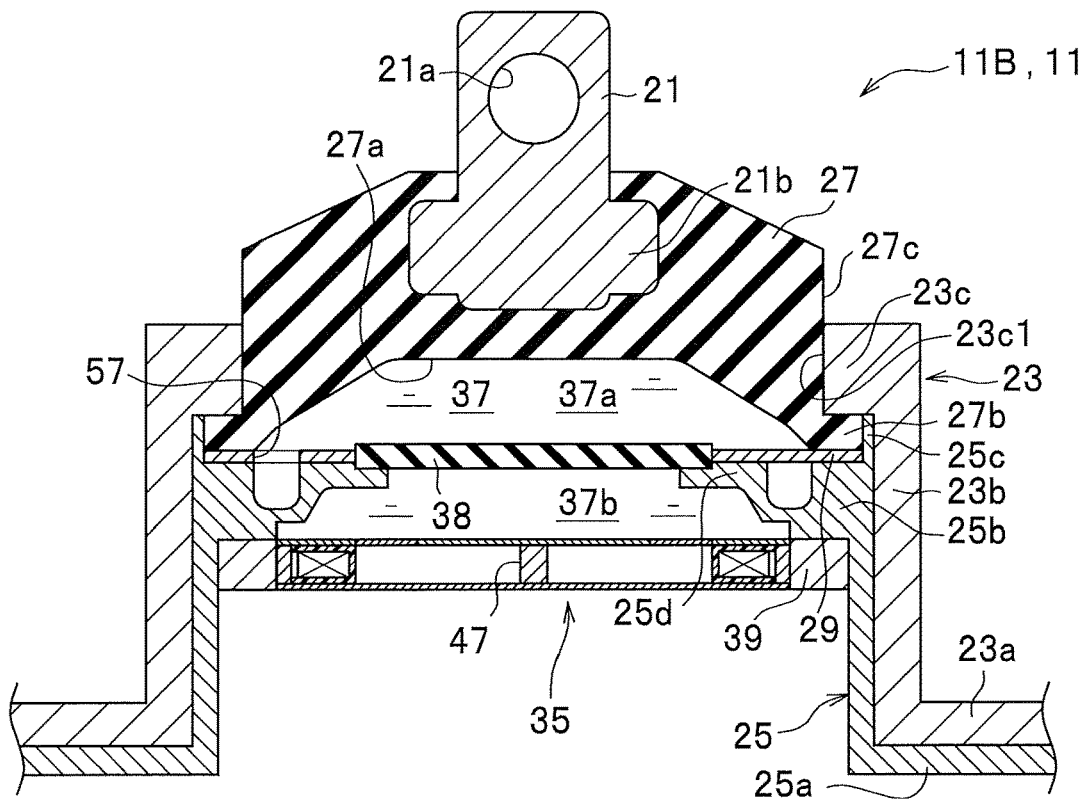
FIG. 3 is a longitudinal sectional view schematically illustrating an active damper according to a second embodiment.

Next, with reference to FIG. 3, described is an outline of the active damper 11B according to the second embodiment of the present invention. FIG. 3 is a longitudinal sectional view schematically illustrating the active damper 11B according to the second embodiment of the present invention.

Note that the active damper 11A according to the first embodiment and the active damper 11B according to the second embodiment have many common elements. Here, only differences therebetween are described instead of explaining the entire configuration of the active damper 11B according to the second embodiment.

The active damper 11A according to the first embodiment and the active damper 11B according to the second embodiment have two main differences.

In the first difference, the active damper 11A according to the first embodiment, as shown in FIG. 1A, has a damping unit 35 as the partition wall section which separates the liquid chamber 37 into the first liquid chamber 37a and the second liquid chamber 37b. In contrast, the active damper 11B according to the second embodiment, as shown in FIG. 3, has a membrane 38 as the partition wall section.

In the second difference, the active damper 11A according to the first embodiment, as shown in FIG. 1A, has a diaphragm 33 as a member that defines a bottom wall portion of the second liquid chamber 37b. In contrast, the active damper 11B according to the second embodiment, as shown in FIG. 3, has the damping unit 35 as a member that defines a bottom wall portion of the second liquid chamber 37b. As shown in FIG. 3, the damping unit 35 is attached, via an annular mounting part 39, to the third mounting part 25.

The following describes an effect of the active damper 11B according to the second embodiment.

When a current flows through the excitation coil 55 of the damping unit 35 used, instead of the diaphragm 33, as a vibration-receiving part, the excitation coil 55 generate a magnetic field, the strength of which depends on the amplitude of the current supplied. As a result, a closed magnetic circuit 36 in the direction indicated by FIG. 2B is formed. At this time, the viscoelasticity of the magneto-viscoelastic elastomer 51 changes depending on the strength of the magnetic field acting on the closed magnetic circuit. Subsequently, the rigidity of the damping unit 35 changes. In addition, when the engine 13 (vibrating source)-derived vibrations are input and the rigidity of the damping unit 35 as the partition wall section changes, the flow volume of the incompressible fluid passing through the orifice 57 is altered. As a result, the damping characteristics of the active damper 11B change.

The active damper 11B according to the second embodiment is configured to provide the bottom wall portion of the second liquid chamber 37b with the damping unit 35 that is used instead of the diaphragm 33 (see FIG. 1A) and allows for even frequency characteristics. Consequently, like the active damper 11A according to the first embodiment, it is possible to retain a damping effect on vibration components over a broad frequency band.

[Outline of Active Damper 11C According to Third Embodiment of the Present Invention]

Figure 4:
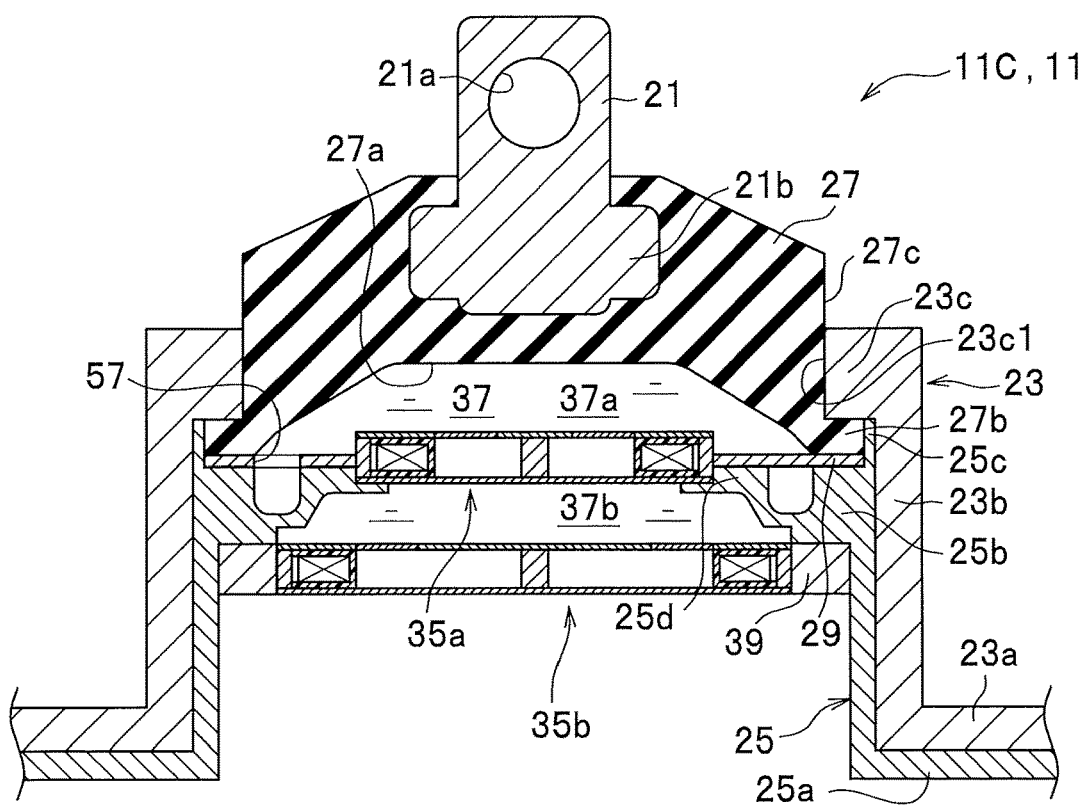
FIG. 4 is a longitudinal sectional view schematically illustrating an active damper according to a third embodiment.

Next, with reference to FIG. 4, described is an outline of the active damper 11C according to the third embodiment of the present invention. FIG. 4 is a longitudinal sectional view schematically illustrating the active damper 11C according to the third embodiment of the present invention.

Note that the active damper 11A according to the first embodiment and the active damper 11C according to the third embodiment have many common elements. Here, differences therebetween are described instead of explaining the configuration of the active damper 11C according to the third embodiment.

The active damper 11A according to the first embodiment and the active damper 11C according to the third embodiment have one main difference.

In the difference, the active damper 11A according to the first embodiment, as shown in FIG. 1A, has the diaphragm 33 as a member that defines a bottom wall portion of the second liquid chamber 37b. In contrast, the active damper 11C according to the third embodiment, as shown in FIG. 4, has a second damping unit 35b, the structure of which is the same as of the damping unit 35, as a member that defines the bottom wall portion of the second liquid chamber 37b. Note that as shown in FIG. 4, the second damping unit 35b is attached, via the annular mounting part 39, to the third mounting part 25.

In the active damper 11C according to the third embodiment, the partition wall section (membrane) is provided with a first damping unit 35a, the structure of which is the same as of the damping unit 35. This point is shared with the active damper 11A according to the first embodiment.

The following describes an effect of the active damper 11C according to the third embodiment.

When a current flows through the excitation coil 55 of the first damping unit 35a used as the partition wall section, the excitation coil 55 generates a magnetic field, the strength of which depends on the amplitude of the current supplied.

In addition, when a current flows through the excitation coil 55 of the second damping unit 35b used as the bottom wall portion of the second liquid chamber 37b, the excitation coil 55 generates a magnetic field, the strength of which depends on the amplitude of the current supplied.

As a result, in each of the first and second damping units 35a and 35b, a closed magnetic circuit 36 in the direction indicated by FIG. 2B is formed. At this time, the viscoelasticity of the magneto-viscoelastic elastomer 51 changes depending on the strength of the magnetic field acting on each closed magnetic circuit. Subsequently, the rigidity of each of the first and second damping units 35a and 35b changes. In addition, when the engine 13 (vibrating source)-derived vibrations are input and the rigidity of each of the first and second damping units 35a and 35b changes, the flow volume of the incompressible fluid passing through the orifice 57 changes. As a result, the damping characteristics of the active damper 11C change.

The active damper 11C according to the third embodiment has, as the partition wall section, the first damping unit 35a that allows for even frequency characteristics. Also, the configuration includes, as the bottom wall portion of the second liquid chamber 37b, the second damping unit 35b that allows for even frequency characteristics. Consequently, it is possible to retain a damping effect on vibration components over a broader frequency band than when the active damper 11A according to the first embodiment is used.

Meanwhile, for instance, the damping characteristics of the first damping unit 35a may be set for and correspond to high frequency vibrations and the damping characteristics of the second damping unit 35b may be set for and correspond to low frequency vibrations. In this case, when high frequency vibrations and low frequency vibrations are simultaneously input, the first damping unit 35a attenuates the high frequency vibrations while the second damping unit 35b attenuates the low frequency vibrations. In this way, the first and second damping units 35a and 35b can each contribute to dealing with the corresponding vibration frequency band.

[Outline of Active Damper 11D According to Fourth Embodiment of the Present Invention]

Figure 5A:
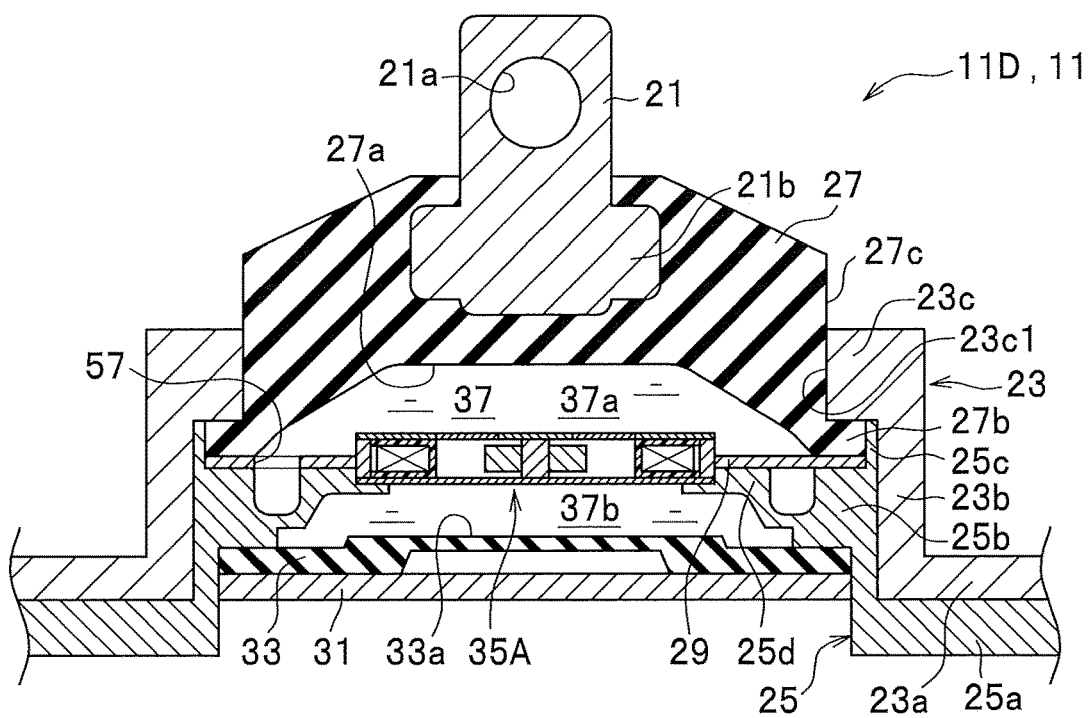
FIG. 5A is a longitudinal sectional view schematically illustrating an active damper according to a fourth embodiment.
Figure 5B:
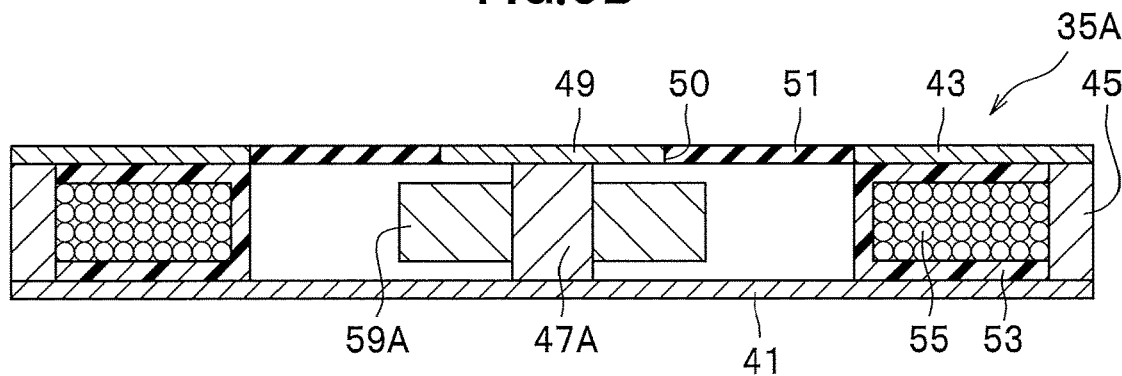
FIG. 5B is a longitudinal sectional magnified view schematically illustrating a damping unit included in the active damper according to the fourth embodiment.
Figure 5C:
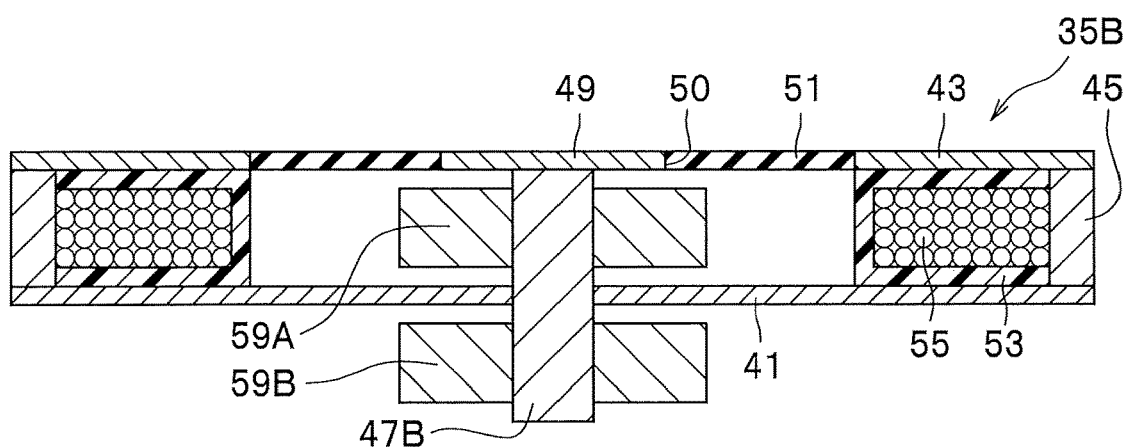
FIG. 5C is a longitudinal sectional magnified view schematically illustrating a damping unit as modified in the fourth embodiment.

Next, with reference to FIGS. 5A, 5B, and 5C, described is an outline of the active damper 11D according to the fourth embodiment of the present invention. FIG. 5A is a longitudinal sectional view schematically illustrating the active damper 11D according to the fourth embodiment of the present invention. FIG. 5B is a longitudinal sectional magnified view schematically illustrating a damping unit 35A included in the active damper according to the fourth embodiment. FIG. 5C is a longitudinal sectional magnified view schematically illustrating a damping unit 35B as modified in the fourth embodiment.

Note that the active damper 11A according to the first embodiment and the active damper 11D according to the fourth embodiment have many common elements. Here, differences therebetween are described instead of explaining the configuration of the active damper 11D according to the fourth embodiment.

The active damper 11A according to the first embodiment and the active damper 11D according to the fourth embodiment have one main difference.

In the difference, the active damper 11A according to the first embodiment, as shown in FIGS. 1A and 1B, does not have an additional particular weight on the fourth cylindrical magnetic member 47 included in the damping unit 35 used as the partition wall section. In contrast, the active damper 11D according to the fourth embodiment, as shown in FIGS. 5A and 5B, has a weight 59A (inertial mass), which looks like a roughly cylindrical object, on the surrounding of the fourth cylindrical magnetic member 47A included in the damping unit 35A used as the partition wall section. How heavy the weight 59A is is set to a suitable value in view of realizing a specific damping characteristic set for the damping unit 35A.

In addition, a modification embodiment of the active damper 11D according to the fourth embodiment is shown in FIG. 5C, the length of the fourth cylindrical magnetic member 47B included in the damping unit 35B extends downwardly of the first magnetic member 41. Also, it is possible to provide an additional weight 59B, which looks like a roughly cylindrical object, on the surrounding of the extended portion. How heavy the additional weight 59B is is set to a suitable value in view of realizing a specific damping characteristic set for the damping unit 35B.

The weights 59A and 59B each correspond to a "mass weight member" of the present invention.

The following describes an effect of the active damper 11D according to the fourth embodiment.

When a current flows through the excitation coil 55 of the damping unit 35A used as the partition wall section, the excitation coil 55 generates a magnetic field, the strength of which depends on the amplitude of the current supplied.

Then, a closed magnetic circuit 36 in the direction indicated by FIG. 2B is formed. At this time, the viscoelasticity of the magneto-viscoelastic elastomer 51 changes depending on the strength of the magnetic field acting on the closed magnetic circuit. Subsequently, the rigidity of the damping unit 35A changes. In addition, when (vibrating source)-derived vibrations are input from the engine 13 and the rigidity of the damping unit 35A changes, the flow volume of the incompressible fluid passing through the orifice 57 changes. As a result, the damping characteristics of the active damper 11D change. On top of that, since the fourth cylindrical magnetic member 47 included in the damping unit 35A is provided with the weight 59A (inertial mass), it is possible to suitably adjust a specific damping characteristic set for the damping unit 35A by adjusting how heavy the weight 59A is.

The active damper 11D (including a modification embodiment) according to the fourth embodiment is provided with the damping unit 35A, which allows for even frequency characteristics, used as the partition wall section. Also, the fourth cylindrical magnetic member 47 included in the damping unit 35A is provided with the weight 59A. Consequently, it is possible to retain a damping effect on vibration components over a more targeted frequency band than when the active damper 11A according to the first embodiment is used.

[Outline of Active Damper 11E According to Fifth Embodiment of the Present Invention]

Figure 6:
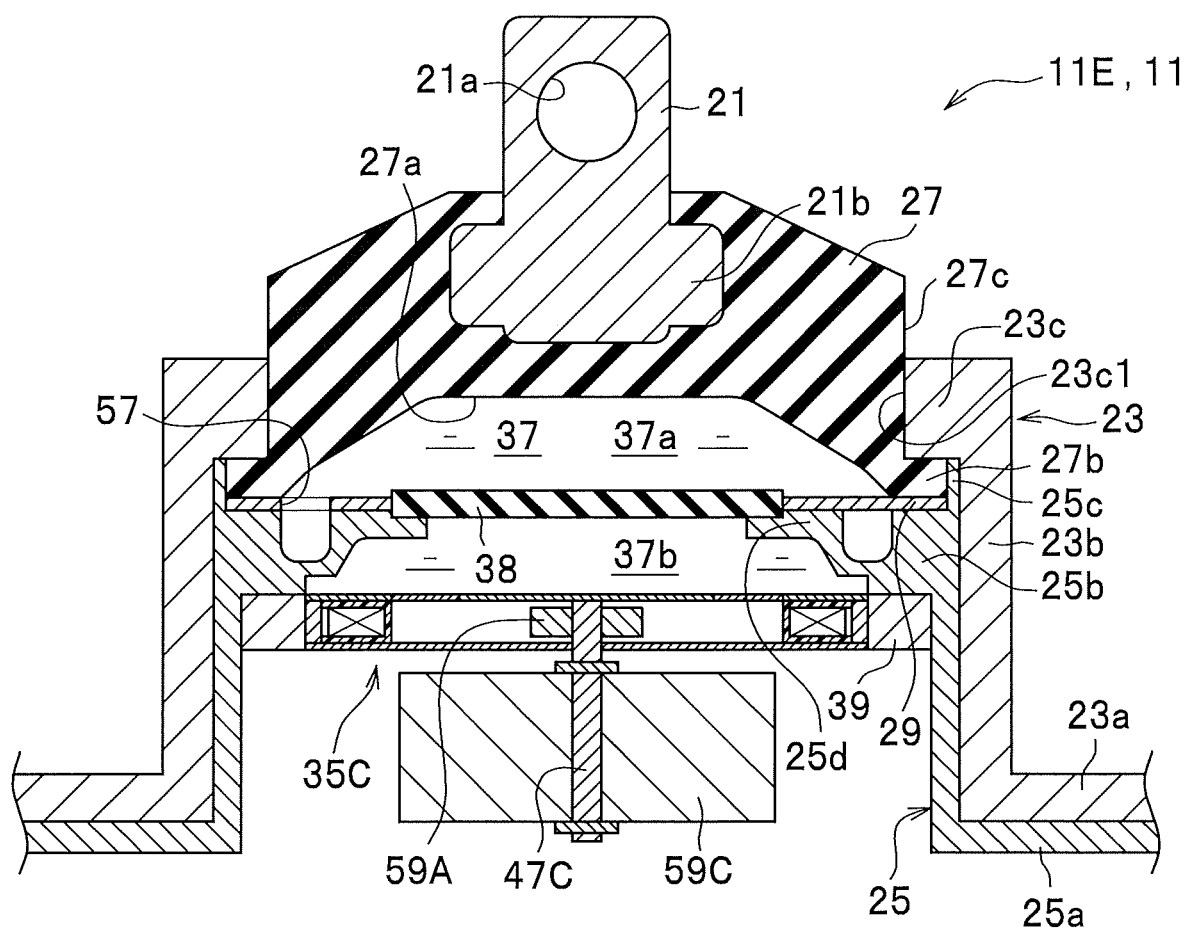
FIG. 6 is a longitudinal sectional view schematically illustrating an active damper according to a fifth embodiment.

Next, with reference to FIG. 6, described is an outline of the active damper 11E according to the fifth embodiment of the present invention. FIG. 6 is a longitudinal sectional view schematically illustrating the active damper 11E according to the fifth embodiment of the present invention.

Note that the active damper 11B according to the second embodiment and the active damper 11E according to the fifth embodiment have many common elements. Here, differences therebetween are described instead of explaining the configuration of the active damper 11E according to the fifth embodiment.

The active damper 11B according to the second embodiment and the active damper 11E according to the fifth embodiment have two main differences.

In the first difference, the active damper 11B according to the second embodiment, as shown in FIG. 3, does not have an additional particular weight on the fourth cylindrical magnetic member 47 included in the damping unit 35C used as the bottom wall portion of the second liquid chamber 37b. In contrast, the active damper 11E according to the fifth embodiment, as shown in FIG. 6, has a weight 59A (inertial mass) on the fourth cylindrical magnetic member 47C included in the damping unit 35C used as the bottom wall portion of the second liquid chamber 37b.

In the second difference with respect to the active damper 11E according to the fifth embodiment, the length of the fourth magnetic member 47C extends downwardly of the first magnetic member 41. Also, provided is an additional giant weight 59C (inertial mass), which looks like a roughly cylindrical object, on the surrounding of the extended portion. How heavy the additional giant weight 59C is is likewise set to a suitable value in view of realizing a specific damping characteristic set for the damping unit 35C.

The giant weight 59C corresponds to a "mass weight member" of the present invention.

The following describes an effect of the active damper 11E according to the fifth embodiment.

When a current flows through the excitation coil 55 of the damping unit 35C used as the bottom wall portion of the second liquid chamber 37b, the excitation coil 55 generates a magnetic field, the strength of which depends on the amplitude of the current supplied.

Then, a closed magnetic circuit 36 in the direction indicated by FIG. 2B is formed in the damping unit 35C. At this time, the viscoelasticity of the magneto-viscoelastic elastomer 51 changes depending on the strength of the magnetic field acting on the closed magnetic circuit. Subsequently, the rigidity of the damping unit 35C changes. In addition, when the engine 13 (vibrating source)-derived vibrations are input and the rigidity of the damping unit 35C changes, the flow volume of the incompressible fluid passing through the orifice 57 is altered. As a result, the damping characteristics of the damping unit 35C change.

Here, the fourth cylindrical magnetic member 47C included in the damping unit 35C is provided with the weight 59A and the giant weight 59C. After how heavy the weight 59A and the giant weight 59C (inertial mass) are is suitably adjusted (a specific damping characteristic set for the damping unit 35C is adjusted), it is possible to satisfactory obtain a damping effect on vibration components over, in particular, a relatively low frequency band (e.g., about 10 Hz).

The active damper 11E according to the fifth embodiment is configured to provide the bottom wall portion of the second liquid chamber 37b with the damping unit 35C that is used instead of the diaphragm 33 and allows for even frequency characteristics. Also, the fourth cylindrical magnetic member 47C included in the damping unit 35C is provided with the weight 59A and the giant weight 59C. Consequently, it is possible to satisfactory retain a damping effect on vibration components over, in particular, a relatively lower frequency band (e.g., about 10 Hz) than when the active damper 11B according to the second embodiment is used.

[Outline of Controller 61 and Peripherals]

Next, with reference to FIG. 7, described is an outline of a controller 61 configured to execute drive control of each active damper 11 according to the present invention. FIG. 7 is a block diagram showing, in short, the controller 61, configured to execute drive control of the damping unit 35 included in each active damper 11 according to the present invention, and its peripherals.

The controller 61, as shown in FIG. 7, includes a control signal generator 63 and a drive section 65. The controller 61 is provided with a microcomputer including a CPU (Central Processing Unit), a ROM (Read Only Memory), and a RAM (Random Access Memory). The microcomputer reads and executes a program stored in the ROM, thereby executing and controlling various functions including a function of generating a control signal.

The control signal generator 63 uses a conversion table for each drive current corresponding to each engine speed. Then, each drive current corresponding to each engine speed is calculated to generate a control signal including information about the calculated drive current. The control signal generated by the control signal generator 63 is transferred to the drive section 65.

The drive section 65 includes a power source (not shown) and a semiconductor switching element. The drive section 65 supplies, to the excitation coil 55 of the drive section 65, a drive current in accordance with the control signal generated by the control signal generator 63.

When the drive current is supplied from the drive section, the excitation coil 55 generates a magnetic field, the strength of which depends on the amplitude of the drive current (corresponding to the level (high or low) of the engine speed). Then, the rigidity of the magneto-viscoelastic elastomer 51 included in the damping unit 35 changes, so that the elastic modulus of the magneto-viscoelastic elastomer 51 changes. This results in a change in the specific vibration frequency (damping characteristic) of each active damper 11 interposed between the engine 13 and the vehicle body frame 15.

[How Each Active Damper Basically Works]

Figure 8:
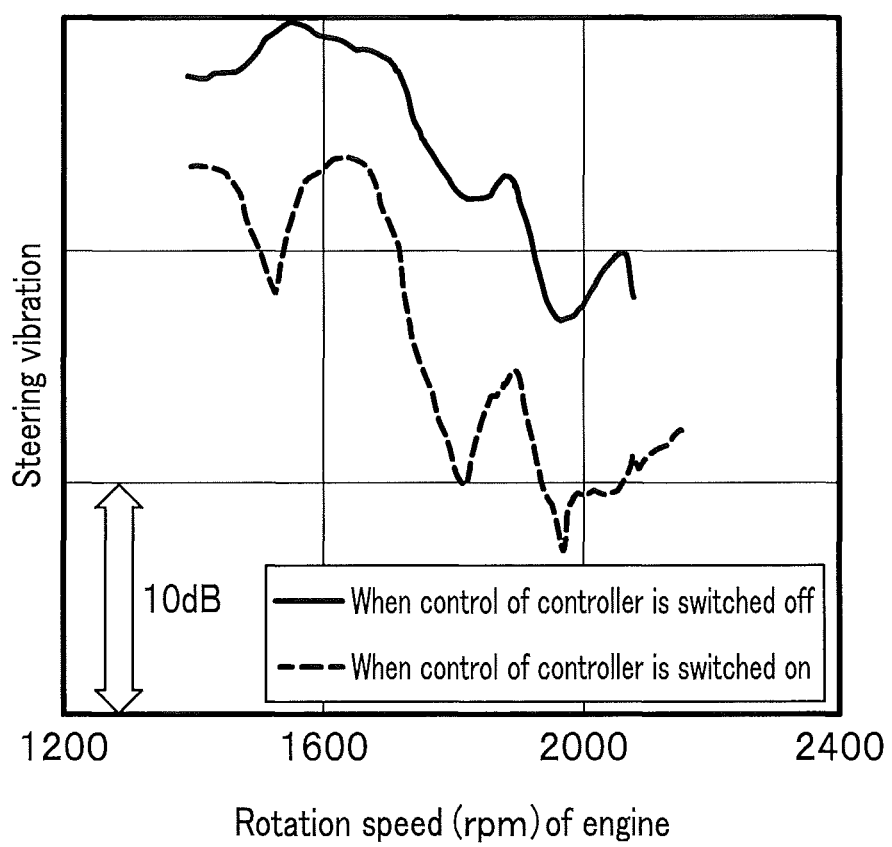
FIG. 8 is a graph showing the magnitude of vibration when control of the damping unit is switched on while the engine rotation speed is being changed. Then, the magnitude is compared with when the control of the damping unit is switched off.

Next, with reference to FIG. 8, described is how each active damper 11 basically works. FIG. 8 is a graph showing the magnitude of steering vibration when control of the damping unit 35 is switched on while the engine 13 rotation speed is being changed. Then, this magnitude is then compared with when the control of the damping unit 35 is switched off.

Under a condition where the excitation coil 55 is not excited in the damping unit 35, magnetic particles are not subject to magnetic polarization, so that the magnetic particles remain in an initial state (dispersed state). As a result, the rigidity of the magneto-viscoelastic elastomer 51 remains the same at an initial value.

Here, when the excitation coil 55 is excited, the magnetic field effect induced by the excitation causes the magnetic particles to be subject to magnetic polarization, so that they are linked to each other and aligned along the direction of the magnetic field. As a result, the rigidity of the magneto-viscoelastic elastomer 51 becomes larger than the initial value.

The rigidity of the magneto-viscoelastic elastomer 51 agrees with the strength of the magnetic field caused by the excitation of the excitation coil 55 (i.e., the level of the rotation speed (vibration frequency) of the engine 13). The rigidity becomes larger as the strength of the magnetic field increases.

Such a change in the rigidity of the magneto-viscoelastic elastomer 51 induces a change in the apparent mass of the engine 13 (i.e., the specific vibration frequency of each active damper 11). In short, the frequency band for vibration waves that can be subject to a damping effect is changed depending on the level of the rotation speed of the engine 13 (i.e., the frequency of vibration waves).

In these embodiments, the rigidity of the magneto-viscoelastic elastomer 51 is changeable in response to a change in the rotation speed of the engine 13 (i.e., a change in the frequency of vibration waves). Accordingly, the specific vibration frequency of each active damper 11 interposed between the engine 13 and the vehicle body frame 15 is adjusted so as to be fit for the vibration wave resonance frequency based on the rotation speed of the engine 13. This makes it possible to comply with the change in the frequency of vibration waves that are subject to damping, so that the damping effect can be kept at a high level.

Consequently, as shown in FIG. 8, when the control of the damping unit 35 is switched on, a damping effect on vibration components over a broad frequency band in accordance with the change in the rotation speed of the engine 13 (i.e., the change in the frequency of vibration waves) can be retained more effectively than when the control of the damping unit 35 is switched off.

[Advantageous Effects of Each Active Damper 11 According to the Present Invention]

The following describes advantageous effects of each active damper 11 according to the present invention.

The active damper 11 according to the first aspect is a liquid-filled active damper interposed between the engine (vibrating source) 13 and the vehicle body frame (vibration-receiving part) 15 that receives the vibrating source-derived vibrations.

The active damper 11 according to the first aspect includes: the elastic support body 27 connected to the vibrating source; the first wall section 27a which is provided at the elastic support body 27 and defines the first liquid chamber 37a; the second wall section 33a which is provided on an opposite side of the first wall section 27a side and defines the second liquid chamber 37b; the partition wall section which separates the first liquid chamber 37a from the second liquid chamber 37b; the orifice 57 which is disposed at the partition wall section and through which liquid passes between the first liquid chamber 37a and the second liquid chamber 37b; and the damping unit 35 configured to attenuate the vibrations transmitted from the vibrating source to the vibration-receiving part.

The damping unit 35 includes: the excitation coil 55 which generate a magnetic field, the strength of which depends on the amplitude of a current supplied; the unit of magnetic members, including magnetic members 41, 43, 45, 47, and 49 used to form a circular closed magnetic circuit, which is a path for the magnetic field generated by the excitation coil 55; and the magneto-viscoelastic elastomer 51, the viscoelasticity of which changes depending on the strength of the magnetic field generated by the excitation coil 55 and which is provided in the closed magnetic circuit 36 (see FIG. 2B) formed of the magnetic members 41, 43, 45, 47, and 49.

At least one of the first wall section 27a, the second wall section 33a, and the partition wall section has the damping unit 35.

Examples of possible embodiments of the active damper 11 according to the first aspect include: the embodiment (the active damper 11A according to the first embodiment) in which the partition wall section is provided with the damping unit 35; the embodiment (the active damper 11B according to the second embodiment) in which the second wall section 33a is provided with the damping unit 35; and the embodiment (the active damper 11C according to the third embodiment) in which the partition wall section and the second wall section 33a are each provided with the damping unit 35.

Here, the embodiment in which the first wall section 27a is provided with the damping unit 35 may be realized by, for example, embedding the damping unit 35 in the first wall section 27a (not shown).

Further, the embodiment in which the first wall section 27a is provided with the damping unit 35 may be combined with: the embodiment in which the partition wall section is provided with the damping unit 35; the embodiment in which the second wall section 33a is provided with the damping unit 35; or the embodiment in which the partition wall section and the second wall section 33a are each provided with the damping unit 35.

In the active damper 11 according to the first aspect, when a current is supplied to the excitation coil 55, the viscoelasticity of the magneto-viscoelastic elastomer 51 changes depending on the strength of the magnetic field generated in the closed magnetic circuit 36. Then, the rigidity of the damping unit 35 changes and the vibration-damping level at the damping unit 35 also changes accordingly. If the amplitude and timing of the current supplied to the excitation coil 55 are appropriately adjusted depending on the magnitude and frequency of the input vibrations, a damping effect on vibration components can be elicited regardless of the (high or low) frequency of the vibrations.

According to the active damper 11 of the first aspect, at least one of the first wall section 27a, the second wall section 33a, and the partition wall section has the damping unit 35, which allows for even frequency characteristics. This makes it possible to retain a damping effect on vibration components over a broad frequency band.

The active damper 11 according to the second aspect is based on the first aspect; the magnetic members 43 and 49 included in the damping unit 35 are formed extending in the direction crossing the direction of vibrations input to the damping unit 35; and the magneto-viscoelastic elastomer 51 of the damping unit 35 is provided in the opening portion 50 created between the magnetic members 43 and 49.

The active damper 11 according to the third aspect is based on the second aspect; the opening portion 50 created between the magnetic members 43 and 49 has an annular shape; and the magneto-viscoelastic elastomer 51 of the damping unit 35 is deployed radially so as to occupy the opening portion 50.

In the active damper 11 according to the third aspect, when a current is supplied to the excitation coil 55, the viscoelasticity of the radially deployed magneto-viscoelastic elastomer 51 changes depending on the strength of the magnetic field generated in the closed magnetic circuit. Then, the rigidity of the damping unit 35 changes and the vibration-damping level at the damping unit 35 also changes accordingly.

According to the active damper 11 of the third aspect, the magneto-viscoelastic elastomer 51 is deployed radially so as to occupy the annular opening portion 50 created between the magnetic members 43 and 49. This enables the damping function of the damping unit 35 to be exerted stably in a highly efficient manner (in a power-saving manner).

The active damper 11 according to the fourth aspect is based on the second and third aspects; the partition wall section (membrane) is provided with the damping unit 35; and the magneto-viscoelastic elastomer 51 of the damping unit 35 is provided in the opening portion that is between the magnetic members 43 and 49 and faces the first liquid chamber 37a.

According to the active damper 11 of the fourth aspect, the partition wall section, which separates the first liquid chamber 37a from the second liquid chamber 37b, is provided with the damping unit 35. When the rigidity of the damping unit 35 is changed, the flow volume of the incompressible fluid passing through the orifice 57 at the time of vibration input changes accordingly. This makes it possible to retain a damping effect on vibration components over a broad frequency band.

The active damper 11 according to the fifth aspect is based on any one of the second to fourth aspects; the first wall section 27a is provided with the damping unit 35; and the magneto-viscoelastic elastomer 51 of the damping unit 35 is provided in the opening portion that is between the magnetic members and faces the first liquid chamber 37a.

According to the active damper 11 of the fifth aspect, the first wall section that is included in the elastic support body 27 and defines the first liquid chamber 37a is provided with the damping unit 35. When the rigidity of the damping unit 35 is changed, the flow volume of the incompressible fluid passing through the orifice 57 at the time of vibration input changes accordingly. This makes it possible to retain a damping effect on vibration components over a broad frequency band.

The active damper 11 according to the sixth aspect is based on any one of the second to fifth aspects; the second wall section 33a is provided with the damping unit 35; and the magneto-viscoelastic elastomer 51 of the damping unit 35 is provided in the opening portion that is between the magnetic members and faces the second liquid chamber 37b.

According to the active damper 11 of the sixth aspect, the second wall section 33a (diaphragm) that is disposed on an opposite side of the first wall section 27a side and defines the second liquid chamber 37b is provided with the damping unit 35. When the rigidity of the damping unit 35 is changed, the flow volume of the incompressible fluid passing through the orifice 57 at the time of vibration input changes accordingly. This makes it possible to retain a damping effect on vibration components over a broad frequency band.

The active damper 11 according to the seventh aspect is based on any one of the first to third aspects; the partition wall section is provided with the first damping unit 35a, the structure of which is common to the damping unit 35; the second wall section 33a is provided with the second damping unit 35b, the structure of which is common to the damping unit 35; the magnetic member 49 included in each of the first and second damping units 35a and 35b has a portion (second magnetic member 43) extending in the direction crossing the input direction of the vibrating source-derived vibrations; and while the first magneto-viscoelastic elastomer 51 of the first damping unit 35a is provided in the opening portion that is between the magnetic members and faces the first liquid chamber 37a, the second magneto-viscoelastic elastomer 51 of the second damping unit 35b is provided in the opening portion that is between the magnetic members and faces the second liquid chamber 37b.

The active damper 11 according to the seventh aspect corresponds to the active damper 11C according to the third embodiment. The active damper 11 of the seventh aspect is provided with, as the partition wall section, the first damping unit 35a that allows for even frequency characteristics. Also, the configuration includes, as the bottom wall portion of the second liquid chamber 37b, the second damping unit 35b that allows for even frequency characteristics. Consequently, it is possible to retain a damping effect on vibration components over a broader frequency band than when the active damper 11A according to the first embodiment is used.

Here, existing engine mounts, for example, may each be interposed between the engine 13 and the vehicle body frame 15 of a vehicle. In this case, it has been difficult to provide satisfactory adjustment over broad frequencies such that while attenuation of low frequency vibrations at or near 10 Hz, which can affect ride comfort, is achieved, the feature of transmitting high frequency vibrations at or near 130 Hz, which can affect engine booming noise, is made small.

Meanwhile, for instance, in the active damper 11 according to the seventh aspect, the damping characteristics of the first damping unit 35a are set for and correspond to high frequency vibrations and the damping characteristics of the second damping unit 35b are set for and correspond to low frequency vibrations.

In this configuration, when high frequency vibrations and low frequency vibrations are simultaneously input, the first damping unit 35a attenuates the high frequency vibrations while the second damping unit 35b attenuates the low frequency vibrations. In this way, the first and second damping units 35a and 35b can each contribute to dealing with the corresponding vibration frequency band.

The active damper 11 according to the eight aspect is based on the seventh aspect; and the strength of the magnetic field acting on the first magneto-viscoelastic elastomer 51 differs from that acting on the second magneto-viscoelastic elastomer 51.

The active damper 11 of the eighth aspect suitably allows for application corresponding to each vibration frequency band when the first and second damping units 35a and 35b each contribute to this application.

The active damper 11 according to the ninth aspect is based on any one of the first to eighth aspects; and the damping unit 35 is provided with the mass weight members 59A, 59B, and/or 59C for adjusting each specific value for the vibrations.

According to the active damper 11 of the ninth aspect, the damping unit 35 is provided with the mass weight members 59A, 59B, and/or 59C for adjusting each specific value for the vibrations. This makes it possible to optionally adjust the damping characteristics (resonance frequency) of the damping unit 35 by suitably adjusting how heavy the mass weight members 59A, 59B, and/or 59C are.

The active damper 11 according to the tenth aspect is based on any one of the first to ninth aspects; the vibrating source is the engine 13 installed in a vehicle; the vibration-receiving part is the vehicle body frame 15 of the vehicle; and each active damper 11 according to the present invention is used when the engine 13 is mounted on the vehicle body frame 15.

According to the active damper 11 of the tenth aspect, the present active damper 11 is used when the engine 13 is mounted on the vehicle body frame 15. This can prevent the engine 13-derived vibrations from being transmitted to the vehicle body frame 15, thereby allowing for vehicles with good ride comfort while the vibration noise is suppressed.

Other Embodiments

The above-described embodiments are examples to be embodied in the present invention. Accordingly, they should not be construed such that the technical scope of the present invention is limited. This is because the present invention can be put into practice, without departing from the sprite and the main features thereof, even in suitably modified embodiments.

As described above, there is provided an active damper 11 including:

an elastic support body 27 connected to a vibrating source such as the engine 13 at one end thereof;

a first wall section 27a which is provided at the elastic support body 27 at an opposite end of the elastic support body 27 and defines a first liquid chamber 37a;

a second wall section 33a which is provided on an opposite side of the first wall section 27a and defines a second liquid chamber 37b;

a partition wall section 71 (including the damping unit 35 and the annular mounting part 29) which separates the first liquid chamber 37a from the second liquid chamber 37b, the first and second liquid chambers 37a, 37b being configured to be liquid-tight and filled with incompressive liquid;

an orifice 57 which is disposed at the partition wall section 71 and through which the liquid passes between the first liquid chamber 37a and the second liquid chamber 37b;

a base 70 supporting the elastic support body 27, being connected a vibration-receiving part such as a vehicle body frame 15; and a damping unit 35 being configured to receive and attenuate the vibrations from a vibrating source at the elastic support body 27, and the damping unit including:
an excitation coil 55 configured to generate a magnetic field, a strength of which depends on an amplitude of a current supplied;
magnetic members 41, 43, 45, 47, 49 configured to have an opening 50 therebetween on a side of the elastic support body 27 and
a magneto-viscoelastic elastomer 51 supported by (connected to) the magnetic members in the opening 51 as a diaphragm, forming a circular closed magnetic circuit with the magnetic members 41, 43, 45, 47, 49; which transmits the magnetic field generated by the excitation coil through the circular closed magnetic circuit; wherein the magneto-viscoelastic elastomer 51 has a viscoelasticity which changes depending on the strength of the magnetic field generated by the excitation coil wherein
at least one of the second wall section 33a and the partition wall section 71 has the damping unit 35, the current being controlled to attenuate the vibration from the vibration source. The second mounting part 23 and the third mounting part 25 provides the base 70.

In the active damper 11, the damping unit includes first and second damping units 35a, 35b. The partition wall section 71 is provided with the first damping unit 35a and the second wall section 33a is provided with the second damping unit 35b. The first and second damping units 35a, 36b having substantially the same configuration.

Each of the first and second damping units 35a, 35b has a portion of the magnetic members 41, 43, 45, 47, 49 extending in a direction D2 (horizontal direction) crossing an input direction D1 (vertical direction) of the vibrating source-derived vibrations.

A magneto-viscoelastic elastomer 51 of the first damping unit 35a is provided to the part of the magnetic members 41, 43, 45, 47, 49 of the first damper 35a facing the first liquid chamber 37a in the opening portion 50, and the magneto-viscoelastic elastomer 51 of the second damping unit 35b is provided to a part of the magnetic members 41, 43, 45, 47, 49 of the second damper 35b facing the second liquid chamber 37b in the opening portion 50.

A strength of a magnetic field acting on the magneto-viscoelastic elastomer of the second damping unit 35b may be different from that of the first damping unit 35a. This is caused by different density of the magnetic particles in the magneto-viscoelastic elastomers 51 of the first and second damping units 35a and 35b or different magnitudes of the drive currents from the drive section 65 which able to generate exciting currents controlled individually.

REFERENCE SIGNS LIST

11 Active dampers according to the present invention
11A Active damper according to the first embodiment
11B Active damper according to the second embodiment
11C Active damper according to the third embodiment
11D Active damper according to the fourth embodiment
11E Active damper according to the fifth embodiment
13 Engine (vibrating source)
15 Vehicle body frame (vibration-receiving part)
27 Elastic support body
27a First wall section
33a Second wall section
35 Damping unit (first wall section, partition wall section, second wall section)
35a First damping unit
35b Second damping unit
37a First liquid chamber
37b Second liquid chamber
41 First magnetic member (magnetic member)
43 Second magnetic member (magnetic member)
45 Third magnetic member (magnetic member)
47 Fourth magnetic member (magnetic member)
49 Fifth magnetic member (magnetic member)
50 Opening portion
51 Magneto-viscoelastic elastomer
55 Excitation coil
57 Orifice
59A, 59B Weight (mass weight member)
59C Giant weight (mass weight member)

The invention claimed is:

1. An active damper interposed between a vibrating source and a vibration-receiving part that receives vibrations of the vibrating source, comprising:
an elastic support body connected to the vibrating source;
a first wall section which is provided at the elastic support body and defines a first liquid chamber;
a second wall section which is provided on an opposite side of the first liquid chamber than the first wall section and defines a second liquid chamber;
a partition wall section which separates the first liquid chamber from the second liquid chamber;
an orifice which is disposed at the partition wall section and through which liquid passes between the first liquid chamber and the second liquid chamber; and
a damping unit configured to attenuate the vibrations transmitted from the vibrating source to the vibration-receiving part,
the damping unit comprising:
an excitation coil configured to generate a magnetic field, a strength of which depends on an amplitude of a current supplied;
a unit of magnetic members configured to form a circular closed magnetic circuit, which is a path for the magnetic field generated by the excitation coil, the unit having an annular member and a central member facing each other in diametrical directions; and
a magneto-viscoelastic elastomer, a viscoelasticity of which changes depending on the strength of the magnetic field generated by the excitation coil and which is provided in the closed magnetic circuit formed of the unit of magnetic members, ends of the magneto-viscoelastic elastomer are connected to the annular member and the central member of the unit, respectively, so that the magnetic field is applied to the magneto-viscoelastic elastomer in the diametrical directions, wherein
at least one of the second wall section and the partition wall section is provided with the damping unit.

2. The active damper according to claim 1, wherein
one of the magnetic members of the unit of magnetic members of the damping unit includes a portion extending in a direction crossing an input direction of vibrations inputted from the vibrating source and
the magneto-viscoelastic elastomer of the damping unit is provided in an opening portion created at an extended portion between the magnetic members.

3. The active damper according to claim 2, wherein
the opening portion created between the magnetic members has an annular shape; and
the magneto-viscoelastic elastomer of the damping unit is disposed radially so as to occupy the opening portion.

4. The active damper according to claim 2, wherein
the partition wall section is provided with the damping unit; and
the magneto-viscoelastic elastomer of the damping unit is provided to a part of the magnetic members facing the first liquid chamber in the opening portion.

5. The active damper according to claim 2, wherein
the second wall section is provided with the damping unit; and
the magneto-viscoelastic elastomer of the damping unit is provided to a part of the magnetic members facing the second liquid chamber in the opening portion.

6. An active damper interposed between a vibrating source and a vibration-receiving part that receives vibrations of the vibrating source, comprising:
an elastic support body connected to the vibrating source;
a first wall section which is provided at the elastic support body and defines a first liquid chamber;
a second wall section which is provided on an opposite side of the first liquid chamber than the first wall section and defines a second liquid chamber;
a partition wall section which separates the first liquid chamber from the second liquid chamber;
an orifice which is disposed at the partition wall section and through which liquid passes between the first liquid chamber and the second liquid chamber; and
a damping unit configured to attenuate the vibrations transmitted from the vibrating source to the vibration-receiving part,
the damping unit comprising:
an excitation coil configured to generate a magnetic field, a strength of which depends on an amplitude of a current supplied;
magnetic members configured to form a circular closed magnetic circuit, a path for the magnetic field generated by the excitation coil; and
a magneto-viscoelastic elastomer, a viscoelasticity of which changes depending on the strength of the magnetic field generated by the excitation coil and which is provided in the closed magnetic circuit formed of the magnetic members,
wherein
at least one of the first wall section, the second wall section, and the partition wall section is provided with the damping unit,
the damping unit comprises first and second damping units;
the partition wall section is provided with the first damping unit and the second wall section is provided with the second damping unit, the first and second damping units having substantially the same configuration;
each of the first and second damping units has a portion of the magnetic members extending in a direction crossing an input direction of the vibrating source-derived vibrations; and
a first magneto-viscoelastic elastomer of the first damping unit is provided to a part of the magnetic members of the first damper facing the first liquid chamber in the opening portion, and the second magneto-viscoelastic elastomer of the second damping unit is provided to a part of the magnetic members of the second damper facing the second liquid chamber in the opening portion.

7. The active damper according to claim 6, wherein
a strength of a magnetic field acting on the first magneto-viscoelastic elastomer differs from a strength of a magnetic field acting on the second magneto-viscoelastic elastomer.

8. The active damper according to claim 1, wherein
the damping unit is provided with a mass weight member for adjusting a specific value for the vibrations.

9. The active damper according to claim 1, wherein
the vibrating source is an engine installed in a vehicle;
the vibration-receiving part is a vehicle body frame of the vehicle; and
the active damper is used when the engine is mounted on the vehicle body frame.

* * * * *